No. 613,965. Patented Nov. 8, 1898.
G. F. CADDEN.
BICYCLE BRAKE.
(Application filed May 8, 1897.)
(No Model.)
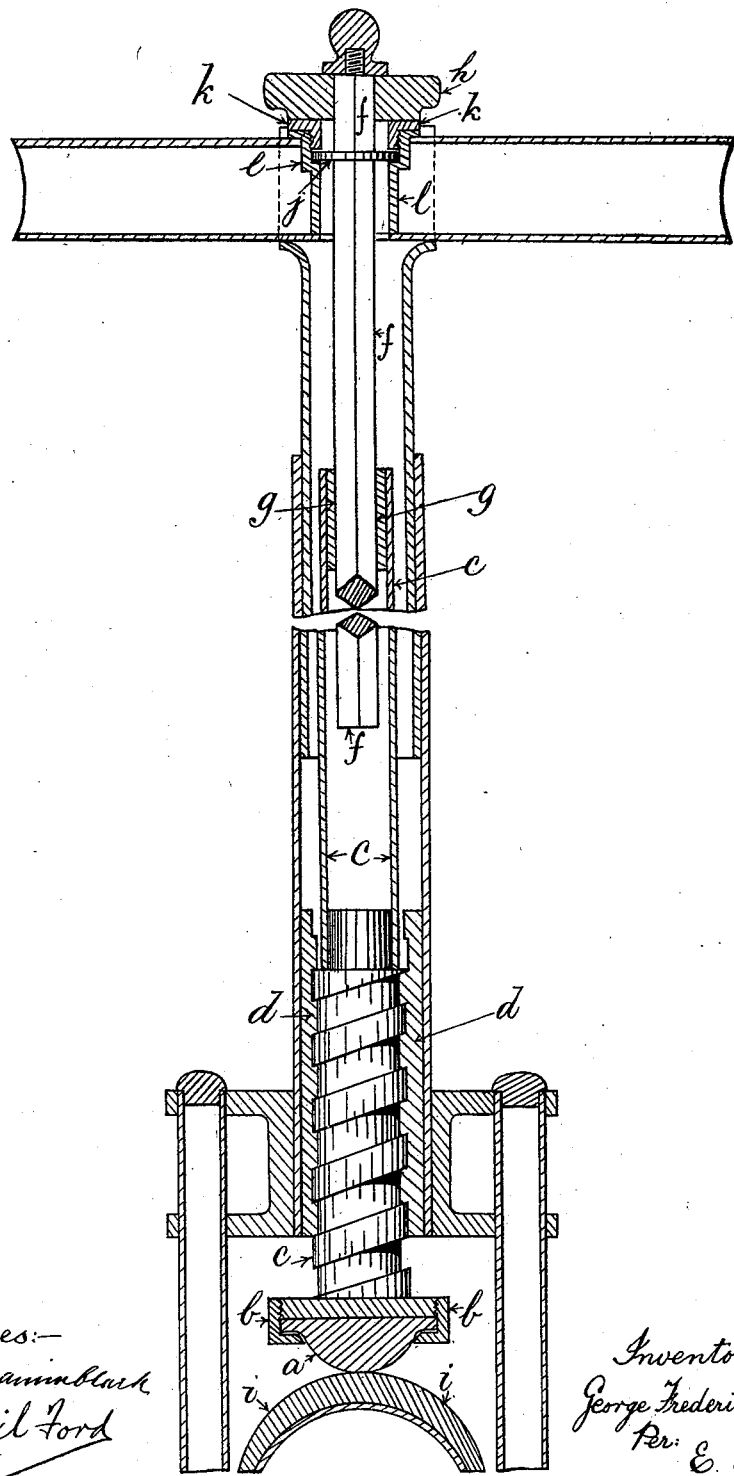
Witnesses:—
Benjamin Black
Cecil Ford
Inventor:
George Frederick Cadden
Per: E. Eaton
His Attorney.

UNITED STATES PATENT OFFICE.

GEORGE FREDERICK CADDEN, OF COVENTRY, ENGLAND.

BICYCLE-BRAKE.

SPECIFICATION forming part of Letters Patent No. 613,965, dated November 8, 1898.

Application filed May 8, 1897. Serial No. 635,711. (No model.)

*To all whom it may concern:*

Be it known that I, GEORGE FREDERICK CADDEN, a subject of the Queen of Great Britain, and a resident of Coventry, in the county of Warwick, England, have invented certain new and useful Improvements in Brakes for Velocipedes and Vehicles, of which the following is a full, clear, and exact specification.
This invention relates to improvements in brakes for velocipedes, the object being to simplify the construction of the brake and at the same time conceal the working parts from view, which are carried in the hollow tube carrying the forks in which the front wheel has its bearings.

In order that my invention may be fully understood, I will now refer to the annexed drawing, in which the figure is a sectional front elevation showing my brake attached to a velocipede.

$a$ is the brake-surface, which is carried in the piece $b$, which is movably attached to the hollow tube $c$, having a screw-thread upon same and which engages in the socket-piece $e$.

$f$ is a rod of square or other suitable section, which engages in the tube, which is provided with a socket $g$ of similar section.

$h$ is a thumb-piece or wheel secured to the top of the rod $f$, so that on rotating same the brake-surface is caused to engage upon the tire of the wheel $i$.

$j$ is a disk or shoulder upon the rod $f$ and which maintains same in position, rotating between the screwed cap $k$, and the bearing $l$ is formed at or about the middle of the handle-bar at the top of the front fork.

One great advantage of this brake is that in the event of the tire becoming deflated through being punctured the brake may be powerfully applied, and thus prevent an accident when riding downhill, as in the lever-brakes now commonly used the brake-surface has not sufficient movement to enable it to engage with the tire in the event of its becoming deflated.

Having thus described my invention, what I claim, and desire to secure by Letters Patent, is—

In brakes for velocipedes of the class herein described in combination; a screw-threaded bar inserted in the lower end of the stem; a screw-threaded metal support carrying on its under surface a brake-shoe which bears upon the tire, and having at its upper end a plug which is square inserted therein into which fits a square rod which rotates the said screwed metal support being adapted to slide freely within the square plug $g$ when the handles are adjusted to different heights.

In testimony that I claim the foregoing I have hereunto set my hand this 20th day of January, 1897.

GEORGE FREDERICK CADDEN.

Witnesses:
 BENJAMIN CLARK,
 RION BUNDY.